United States Patent
Mochizuki

(10) Patent No.: US 10,808,056 B2
(45) Date of Patent: Oct. 20, 2020

(54) POLYETHYLENE FIBER

(71) Applicant: Asahi Kasei Kabushiki Kaisha, Tokyo (JP)

(72) Inventor: Shinsuke Mochizuki, Tokyo (JP)

(73) Assignee: Asahi Kasei Kabushiki Kaisha, Tokyo (JP)

(*) Notice: Subject to any disclaimer, the term of this patent is extended or adjusted under 35 U.S.C. 154(b) by 0 days.

(21) Appl. No.: 16/509,569

(22) Filed: Jul. 12, 2019

(65) Prior Publication Data

US 2020/0017614 A1 Jan. 16, 2020

(30) Foreign Application Priority Data

Jul. 13, 2018 (JP) .................................. 2018-133386
May 17, 2019 (JP) .................................. 2019-093563

(51) Int. Cl.
| | | |
|---|---|---|
| *C08F 10/02* | (2006.01) | |
| *D01F 6/04* | (2006.01) | |
| *D07B 1/02* | (2006.01) | |
| *C08F 110/02* | (2006.01) | |
| *D01F 6/30* | (2006.01) | |

(52) U.S. Cl.
CPC .............. *C08F 110/02* (2013.01); *D01F 6/04* (2013.01); *C08F 10/02* (2013.01); *D01F 6/30* (2013.01); *D07B 2201/2009* (2013.01); *D07B 2205/201* (2013.01); *D07B 2501/2061* (2013.01)

(58) Field of Classification Search
None
See application file for complete search history.

(56) References Cited

U.S. PATENT DOCUMENTS

| | | |
|---|---|---|
| 2015/0259042 A1 | 9/2015 | Vlasblom et al. |
| 2016/0108556 A1 | 4/2016 | Vlasblom et al. |
| 2019/0194431 A1* | 6/2019 | Tsujimoto ........... C08L 23/0815 |
| 2019/0248979 A1* | 8/2019 | Mochizuki ............. C08F 10/02 |

FOREIGN PATENT DOCUMENTS

| | | | |
|---|---|---|---|
| JP | 2015-531330 A | 11/2015 | |
| JP | 2016-524658 A | 8/2016 | |

* cited by examiner

*Primary Examiner* — Richard A Huhn

(74) *Attorney, Agent, or Firm* — Morgan, Lewis & Bockius LLP

(57) ABSTRACT

A polyethylene fiber wherein when a free induction decay (M(t)) of the polyethylene fiber at 90° C. measured by a pulsed nuclear magnetic resonance (NMR) solid echo method is approximated to three components of a component ($\alpha$) having a lowest mobility, a component ($\beta$) having an intermediate mobility, and a component ($\gamma$) having a highest mobility, by fitting using formula 1 ($M(t)=\alpha \exp(-(1/2)(t/T_\alpha)^2)\sin bt/bt+\beta \exp(-(1/Wa)(t/T_\beta)^{Wa})+\gamma \exp(-t/T_\gamma)$), a composition fraction of the component ($\gamma$) having the highest mobility is 1% or more and 10% or less, and a relaxation time of the component ($\gamma$) having the highest mobility is 100 µs or more and 1000 µs or less.

17 Claims, No Drawings

POLYETHYLENE FIBER

BACKGROUND OF THE INVENTION

Field of the Invention

The present invention relates to a polyethylene fiber.

Description of the Related Art

Polyethylene fibers are lightweight and excellent in strength and therefore have been conventionally used in various applications such as ropes, nets, fishing lines, gloves, clothes, and laminates. Particularly, in applications where a high load is applied under a marine environment for a long period, as typified by ship mooring ropes, fibers comprising ultrahigh molecular weight polyethylene are used. Examples of the properties required of ship mooring ropes include strength, creep resistance, wear resistance, and weather resistance (for example, see National Publication of International Patent Application No. 2015-531330). Particularly in recent years, the demand for creep resistance has increased further. Therefore, various methods have been conventionally proposed as methods for increasing the creep resistance of polyethylene fibers, (for example, see National Publication of International Patent Application No. 2016-524658).

For the improvement of the creep resistance of a polyethylene fiber, there is a method of introducing a comonomer into the molecular chain of polyethylene. However, the strength cannot be increased, and in addition the crystallinity decreases, and therefore decreases in wear resistance and weather resistance are problems. For the improvement of the weather resistance of a polyethylene fiber, a weather-resistant agent is formulated. However, further improvement is desired, and particularly improvement is desired from the viewpoint of strength retention in use in the vicinity of salt water or under a sea water atmosphere. The reason is that in use in the vicinity of salt water or under a sea water atmosphere, polyethylene fibers are often used as a bundle, and under such an environment, when one yarn of the polyethylene fiber decreases in strength and breaks, the load applied to other unbroken yarns increases, and breakage and creep accelerate also as the bundle.

Accordingly, it is an object of the present invention to provide, for example, a polyethylene fiber having excellent creep resistance, a high strength retention rate, and wear resistance in marine use.

SUMMARY OF THE INVENTION

The present inventor has diligently pursued studies in order to solve the problems of the conventional art described above, and as a result found that a polyethylene fiber in which the composition fraction and relaxation time of the high mobility component are in particular ranges can solve the above problems, and completed the present invention.

Specifically, the present invention is as follows.

[1] A polyethylene fiber wherein when a free induction decay (M(t)) of the polyethylene fiber at 90° C. measured by a pulsed nuclear magnetic resonance (NMR) solid echo method is approximated to three components of a component ($\alpha$) having a lowest mobility, a component ($\beta$) having an intermediate mobility, and a component ($\gamma$) having a highest mobility, by fitting using following formula 1, a composition fraction of the component ($\gamma$) having the highest mobility is 1% or more and 10% or less, and a relaxation time of the component ($\gamma$) having the highest mobility is 100 µs or more and 1000 µs or less.

$$M(t) = \alpha \exp(-(1/2)(t/T_\alpha)^2)\sin bt/bt + \beta \exp(-(1/Wa)(t/T_\beta)^{Wa}) + \gamma \exp(-t/T_\gamma) \quad \text{formula 1}$$

$\alpha$: a composition fraction (%) of the component ($\alpha$)
$T_\alpha$: a relaxation time (msec) of the component ($\alpha$)
$\beta$: a composition fraction (%) of the component ($\beta$)
$T_\beta$: a relaxation time (msec) of the component ($\beta$)
$\gamma$: a composition fraction (%) of the component ($\gamma$)
$T_\gamma$: a relaxation time (msec) of the component ($\gamma$)
t: observation time (msec)
Wa: shape factor (1<Wa<2)
b: shape factor (0.1<b<0.2)

[2] The polyethylene fiber according to [1], having a limiting viscosity ($\eta$) of 11 or more and 30 or less.

[3] The polyethylene fiber according to [1] or [2], wherein no endothermic peak is detected in a range of 152° C. or more in a DSC curve of a second temperature increase process (measurement condition (iii)) obtained by measurement conditions of following (i) to (iii) using a differential scanning calorimeter (DSC), (DSC Measurement Conditions)

(i) temperature is maintained at 50° C. for 1 min and then increased to 180° C. at a temperature increase rate of 10° C./min (ii) temperature is maintained at 180° C. for 5 min and then decreased to 50° C. at a temperature decrease rate of 10° C./min (iii) temperature is maintained at 50° C. for 5 min and then increased to 180° C. at a temperature increase rate of 10° C./min.

[4] The polyethylene fiber according to any of [1] to [3], wherein a ratio (B)/(A) of a melting heat quantity (B) to a melting heat quantity (A) is 1 or more and 3 or less, wherein the melting heat quantity (A) is detected in a range of 160° C. to 170° C. in a DSC curve of a temperature increase process obtained by a measurement condition of following (I) using a differential scanning calorimeter (DSC), and the melting heat quantity (B) is detected in a range of 160° C. to 170° C. in a DSC curve of a second temperature increase process (measurement condition (IV)) obtained by measurement conditions of following (II) to (IV) using the DSC, (DSC Measurement Conditions)

(I) temperature is maintained at 50° C. for 1 min and then increased to 180° C. at a temperature increase rate of 10° C./min (II) temperature is maintained at 50° C. for 1 min and then increased to 140° C. at a temperature increase rate of 10° C./min (III) temperature is maintained at 140° C. for 5 min and then decreased to 50° C. at a temperature decrease rate of 10° C./min (IV) temperature is maintained at 50° C. for 5 min and then increased to 180° C. at a temperature increase rate of 10° C./min.

[5] The polyethylene fiber according to [1], wherein the composition fraction of the component ($\gamma$) having the highest mobility is 2% or more and 5% or less, and the relaxation time of the component ($\gamma$) having the highest mobility is 200 µs or more and 500 µs or less.

[6] The polyethylene fiber according to [1], having a limiting viscosity ($\eta$) of 15 or more and 30 or less.

[7] The polyethylene fiber according to [1], wherein a ratio (B)/(A) of a melting heat quantity (B) to a melting heat quantity (A) is 1.5 or more and 2.7 or less, wherein the melting heat quantity (A) is detected in a range of 160° C. to 170° C. in a DSC curve of a temperature increase process obtained by a measurement condition of following (I) using a differential scanning calorimeter (DSC), and the melting heat quantity (B) is detected in a range of 160° C. to 170° C. in a DSC curve of a second temperature increase process (measurement condition (IV)) obtained by measurement conditions of following (II) to (IV) using the DSC, (DSC Measurement Conditions)

(I) temperature is maintained at 50° C. for 1 min and then increased to 180° C. at a temperature increase rate of 10° C./min (II) temperature is maintained at 50° C. for 1 min and then increased to 140° C. at a temperature increase rate of 10° C./min (III) temperature is maintained at 140° C. for 5 min and then decreased to 50° C. at a temperature decrease rate of 10° C./min (IV) temperature is maintained at 50° C. for 5 min and then increased to 180° C. at a temperature increase rate of 10° C./min.

[8] The polyethylene fiber according to [1], having a chlorine (Cl) content of 50 ppm or less.

[9] The polyethylene fiber according to [1], having an aluminum (Al) content of 5 ppm or less.

[10] The polyethylene fiber according to [1], having a chlorine (Cl) content of 5 ppm or less.

[11] Marine use of a polyethylene fiber wherein when a free induction decay (M(t)) of the polyethylene fiber at 90° C. measured by a pulsed nuclear magnetic resonance (NMR) solid echo method is approximated to three components of a component ($\alpha$) having a lowest mobility, a component ($\beta$) having an intermediate mobility, and a component ($\gamma$) having a highest mobility, by fitting using following formula 1, a composition fraction of the component ($\gamma$) having the highest mobility is 1% or more and 10% or less, and a relaxation time of the component ($\gamma$) having the highest mobility is 100 µs or more and 1000 µs or less.

$$M(t)=\alpha \exp(-(1/2)(t/T_\alpha)^2)\sin bt/bt+\beta \exp(-(1/Wa)(t/T_\beta)^{Wa})+\gamma \exp(-t/T_\gamma) \quad \text{formula 1}$$

$\alpha$: a composition fraction (%) of the component ($\alpha$)
$T_\alpha$: a relaxation time (msec) of the component ($\alpha$)
$\beta$: a composition fraction (%) of the component ($\beta$)
$T_\beta$: a relaxation time (msec) of the component ($\beta$)
$\gamma$: a composition fraction (%) of the component ($\gamma$)
$T_\gamma$: a relaxation time (msec) of the component ($\gamma$)
t: observation time (msec)
Wa: shape factor (1<Wa<2)
b: shape factor (0.1<b<0.2)

Advantageous Effect of Invention

According to the present invention, it is possible to provide, for example, a polyethylene fiber having excellent creep resistance, a high strength retention rate, and high wear resistance in marine use.

DETAILED DESCRIPTION OF THE PREFERRED EMBODIMENT

An embodiment for carrying out the present invention (hereinafter referred to as "present embodiment") will be described in detail below. The present invention is not limited to following description, and various modifications can be made without departing from the spirit thereof.

[Polyethylene Fiber]

In the polyethylene fiber of the present embodiment, when the free induction decay at 90° C. measured by a pulsed nuclear magnetic resonance (NMR) solid echo method is subjected to three-component approximation, the composition fraction of a component ($\gamma$) having a highest mobility is 1% or more and 10% or less, and the relaxation time of the component ($\gamma$) having the highest mobility is 100 µs or more and 1000 µs or less.

The requirements of the polyethylene fiber of the present embodiment will be described below.

[Three-Component Approximation of Free Induction Decay at 90° C. Measured by Pulsed NMR Solid Echo Method]

In the polyethylene fiber of the present embodiment, the free induction decay (M(t)) of the polyethylene fiber at 90° C. measured by the pulsed NMR solid echo method is approximated to three components of a component ($\alpha$) having a lowest mobility, a component ($\beta$) having an intermediate mobility, and a component ($\gamma$) having a highest mobility, by fitting using following formula 1.

$$M(t)=\alpha \exp(-(1/2)(t/T_\alpha)^2)\sin bt/bt+\beta \exp(-(1/Wa)(t/T_\beta)^{Wa})+\gamma \exp(-t/T_\gamma) \quad \text{formula 1}$$

$\alpha$: the composition fraction (%) of the component ($\alpha$)
$T_\alpha$: the relaxation time (msec) of the component ($\alpha$)
$\beta$: the composition fraction (%) of the component ($\beta$)
$T_\beta$: the relaxation time (msec) of the component ($\beta$)
$\gamma$: the composition fraction (%) of the component ($\gamma$)
$T_\gamma$: the relaxation time (msec) of the component ($\gamma$)
t: observation time (msec)
Wa: shape factor (1<Wa<2)
b: shape factor (0.1<b<0.2)

More specifically, measurement can be performed by a method described in Examples.

[Composition Fraction and Relaxation Time of Component ($\gamma$) Having Highest Mobility]

In the polyethylene fiber of the present embodiment, when the free induction decay of the polyethylene fiber at 90° C. measured by the pulsed NMR solid echo method is approximated to three components, the composition fraction of the component ($\gamma$) having the highest mobility (hereinafter also simply referred to as a component ($\gamma$) or a component ($\gamma$) having the highest mobility) is 1% or more and 10% or less, preferably 2% or more and 7% or less, and more preferably 2% or more and 5% or less. The relaxation time of the component ($\gamma$) having the highest mobility is 100 µs or more and 1000 µs or less, preferably 200 µs or more and 700 µs or less, and more preferably 200 µs or more and 500 µs or less.

In the polyethylene fiber of the present embodiment, when the composition fraction of the component ($\gamma$) is 1% or more, the amount of the high mobility component at the time of high temperature is sufficient, and the occurrence of cracks between the molecules caused by a change in molecular motion due to an environmental change from a high temperature and high humidity state to a high temperature dry state in a salting and drying cycle test is suppressed, and therefore, for example, the strength retention rate during marine use is excellent. On the other hand, in the polyethylene fiber of the present embodiment, when the composition fraction of the component ($\gamma$) is 10% or less, the fiber surface strength is sufficient, and the polyethylene fiber is resistant to wear due to rust on an iron pipe and the adhesion of salt in a salting and drying cycle test, and, also in use as a bundle, the polyethylene fibers are resistant to wear due to strong rubbing of the yarns due to the salt crystallized inside the bundle, and therefore the polyethylene fiber is, for example, excellent in wear resistance during marine use.

In the polyethylene fiber of the present embodiment, when the relaxation time of the component (γ) is 100 μs or more, the molecular mobility of the high mobility component at the time of high temperature is sufficient, and it is possible to relax strain caused by a change in molecular motion due to an environmental change from a high temperature and high humidity state to a high temperature dry state in a salting and drying cycle test, and therefore, for example, the strength retention rate during marine use is excellent. On the other hand, in the polyethylene fiber of the present embodiment, when the relaxation time of the component (γ) is 1000 μs or less, the mobility of the molecules is sufficiently suppressed, and, also in the application of stress at high temperature, the movement of the molecules is suppressed, and therefore, for example, the creep resistance during marine use is good.

The method for controlling the composition fraction and relaxation time of the component (γ) having the highest mobility is not particularly limited, but it is preferred that when the polyethylene fiber is divided into three components having different molecular mobility, the amounts of the respective components are suitably controlled. For that, it is preferred that while the molecular chains of polyethylene are highly drawn to form extended chain crystals, moderate entanglement is caused. It can be said that in such a polyethylene fiber, the crystal structure is in a particular state. For that, the polyethylene fiber can be obtained by devising the starting material polyethylene used and the polyethylene fiberization processing step.

Specific examples are not particularly limited and include using an organomagnesium for a promoter, and contacting a catalyst and the promoter with each other followed by feeding to a polymerization vessel, from the viewpoint of suitably controlling the entanglement of polyethylene that is the starting material, and include solvent removal followed by drawing 2 times under an atmosphere at 50° C. followed by drawing at high temperature, and drawing at 140° C. followed by cooling to 25° C. at a rate of 10° C./min, from the viewpoint of controlling the entanglement of polyethylene in fiber processing. By uniformly distributing the entangled portions and extended chain portions of the molecular chains during drawing, and controlling the constraint of the entangled portions, the composition fraction and relaxation time of the component (γ) can be controlled.

In the present embodiment, the composition fraction and relaxation time of the component (γ) can be measured by a method described in Examples.

[Limiting Viscosity]

The limiting viscosity (η) of the polyethylene fiber of the present embodiment is preferably 11 or more and 30 or less, more preferably 13 or more and 30 or less, and further preferably 15 or more and 30 or less. In the polyethylene fiber of the present embodiment, when the limiting viscosity (η) is 11 or more, a molecular weight sufficient for high drawing can be ensured, and the strength is more increased. On the other hand, in the polyethylene fiber of the present embodiment, when the limiting viscosity (η) is 30 or less, production is more possible under industrial conditions.

The limiting viscosity (η) of the polyethylene fiber of the present embodiment can be controlled by appropriately adjusting polymerization conditions and the like using an olefin-based polymerization catalyst. Specifically, the limiting viscosity (η) can be controlled by allowing hydrogen to exist in a polymerization system, changing polymerization temperature, or the like.

The limiting viscosity (η) of the polyethylene fiber of the present embodiment can be specifically measured, for example, by preparing a solution of the polyethylene fiber dissolved in decalin at different concentration, measuring the solution viscosity of the solution at 135° C., and substituting into the desired formula the reduced viscosity calculated from the measured solution viscosity. Specifically, the limiting viscosity (η) can be measured by a method described in Examples.

(Endothermic Peak in Range of 152° C. or More in Second Temperature Increase Process Using DSC)

It is preferred that in the polyethylene fiber of the present embodiment, no endothermic peak is detected in the range of 152° C. or more in the DSC curve of the second temperature increase process (measurement condition (iii)) obtained by the measurement conditions of following (i) to (iii) using the differential scanning calorimeter (DSC).

(DSC Measurement Conditions)

(i) The temperature is maintained at 50° C. for 1 min and then increased to 180° C. at a temperature increase rate of 10° C./min.

(ii) The temperature is maintained at 180° C. for 5 min and then decreased to 50° C. at a temperature decrease rate of 10° C./min.

(iii) The temperature is maintained at 50° C. for 5 min and then increased to 180° C. at a temperature increase rate of 10° C./min.

When no endothermic peak is detected in the range of 152° C. or more in the DSC curve of the second temperature increase process (measurement condition (iii)) using the DSC, the extended chains and the entanglement of the molecules are uniformly distributed in the fiber, and therefore excellent strength retention properties can be provided to the fiber. The presence or absence of the endothermic peak in the range of 152° C. or more in the DSC curve of the second temperature increase process (measurement condition (iii)) using the DSC can be measured by a method described in Examples described later.

The polyethylene fiber in which no endothermic peak in the range of 152° C. or more in the DSC curve of the second temperature increase process (measurement condition (iii)) using the DSC is detected can be obtained by placing polyethylene in an extruder in a state in which polyethylene particles are formed into a high concentration slurry with a solvent, then further adding the solvent to adjust the concentration, and extruding the mixture, or extremely increasing the L/D of the extruder, or placing a low concentration slurry in an extruder and then removing the solvent by venting to adjust the concentration.

(Melting Heat Quantity Ratio ((B)/(A)))

It is preferred that in the polyethylene fiber of the present embodiment, the ratio (B)/(A) of the melting heat quantity (B) to the melting heat quantity (A) is 1 or more and 3 or less, wherein the melting heat quantity (A) is detected in the range of 160° C. to 170° C. in the DSC curve of the temperature increase process obtained by the measurement condition of following (I) using a differential scanning calorimeter (DSC), and the melting heat quantity (B) is detected in the range of 160° C. to 170° C. in the DSC curve of the second temperature increase process (measurement condition (IV)) obtained by the measurement conditions of following (II) to (IV) using a DSC.

(DSC Measurement Conditions)

(I) The temperature is maintained at 50° C. for 1 min and then increased to 180° C. at a temperature increase rate of 10° C./min.

(II) The temperature is maintained at 50° C. for 1 min and then increased to 140° C. at a temperature increase rate of 10° C./min.

(III) The temperature is maintained at 140° C. for 5 min and then decreased to 50° C. at a temperature decrease rate of 10° C./min.

(IV) The temperature is maintained at 50° C. for 5 min and then increased to 180° C. at a temperature increase rate of 10° C./min.

The ratio ((B)/(A)) between the melting heat quantities (A) and (B) is preferably 1.0 or more and 3.0 or less, more preferably 1.3 or more and 2.7 or less, and further preferably 1.5 or more and 2.7 or less. In the polyethylene fiber of the present embodiment, when the melting heat quantity ratio ((B)/(A)) is 1.0 or more, production is more possible under industrial conditions. On the other hand, in the polyethylene fiber of the present embodiment, when the melting heat quantity ratio ((B)/(A)) is 3.0 or less, local drawing unevenness without transition to extended chains due to no application of stress during drawing can be suppressed, and the creep resistance is better.

The method for controlling the melting heat quantity ratio ((B)/(A)) is not particularly limited, and examples thereof include a method of cooling by contact with a liquid paraffin at 120° C. after spinning, and a method of spinning with low discharge.

The melting heat quantity ratio ((B)/(A)) can be measured by a method described in Examples described later.

(Content of Chlorine Contained in Polyethylene Fiber)

The content of chlorine (Cl) in the polyethylene fiber of the present embodiment is preferably 50 ppm or less, more preferably 25 ppm or less, and further preferably 5 ppm or less in terms of weight based on the entire polyethylene fiber. In the polyethylene fiber of the present embodiment, when the chlorine content is 50 ppm or less, the yarn strength tends to improve. The lower limit of the chlorine content is not particularly limited and is, for example, 1.0 ppm. The chlorine content can be measured by a method described in Examples described later.

The chlorine content in the polyethylene fiber can be reduced by using a catalyst described later or increasing productivity per unit catalyst.

(Content of Aluminum Contained in Polyethylene Fiber)

The content of aluminum (Al) in the polyethylene fiber of the present embodiment is preferably 5 ppm or less, more preferably 3 ppm or less, and further preferably 2 ppm or less in terms of weight based on the entire polyethylene fiber. In the polyethylene fiber of the present embodiment, when the aluminum content is 5 ppm or less, the yarn strength tends to improve. The lower limit of the aluminum content is not particularly limited and is, for example, 0.5 ppm. The aluminum content can be measured by a method described in Examples described later.

The aluminum content in the polyethylene fiber of the present embodiment can be reduced by using a catalyst described later or increasing productivity per unit catalyst.

(Polyethylene)

Examples of the polyethylene constituting the polyethylene fiber of the present embodiment include, but are not limited to, ethylene homopolymers or copolymers of ethylene and one or more other monomers (for example, binary or ternary copolymers). The bonding form of the copolymers may be a random form or a block form. Examples of other monomers include, but are not limited to, α-olefins and vinyl compounds. Examples of the α-olefins include, but are not limited to, α-olefins having 3 to 20 carbon atoms such as propylene, 1-butene, 4-methyl-1-pentene, 1-hexene, 1-octene, 1-nonene, 1-decene, 1-undecene, 1-dodecene, 1-tridecene, and 1-tetradecene. Examples of the vinyl compounds include, but are not limited to, vinylcyclohexane, styrene, and derivatives thereof. Nonconjugated polyenes such as 1,5-hexadiene and 1,7-octadiene can be used as other monomers as needed. One of these other monomers can be used alone, or two or more of these other monomers can be used in combination.

(Additives)

Further, the polyethylene fiber of the present embodiment may contain additives such as a neutralizing agent, an antioxidant, and a light-resistant stabilizer.

The neutralizing agent is used as a catcher for chlorine contained in polyethylene, a molding processing aid, or the like. Examples of the neutralizing agent include, but are not limited to, stearates of alkaline earth metals such as calcium, magnesium, and barium. The content of the neutralizing agent is not particularly limited but is preferably 3000 ppm or less, more preferably 1000 ppm or less, and further preferably 500 ppm or less in terms of mass based on the entire polyethylene.

Examples of the antioxidant include, but are not limited to, phenolic antioxidants such as dibutylhydroxytoluene, pentaerythrityl-tetrakis[3-(3,5-di-t-butyl-4-hydroxyphenyl) propionate], and octadecyl-3-(3,5-di-t-butyl-4-hydroxyphenyl) propionate. The content of the antioxidant is not particularly limited but is preferably 1% by mass or less, more preferably 0.5% by mass or less, and further preferably 0.1% by mass or less in terms of mass based on the entire polyethylene.

Examples of the light-resistant stabilizer include, but are not limited to, benzotriazole-based light-resistant stabilizers such as 2-(5-methyl-2-hydroxyphenyl)benzotriazole and 2-(3-t-butyl-5-methyl-2-hydroxyphenyl)-5-chlorobenzotriazole; and hindered amine-based light-resistant stabilizers such as bis(2,2,6,6-tetramethyl-4-piperidine) sebacate and poly[{6-(1,1,3,3-tetramethylbutyl)amino-1,3,5-triazine-2,4-diyl}{(2,2,6,6-tetramethyl-4-piperidyl) imino}hexamethylene{(2,2,6,6-tetramethyl-4-piperidyl) imino}]. The content of the light-resistant stabilizer is not particularly limited but is preferably 5000 ppm or less, more preferably 4000 ppm or less, and further preferably 3000 ppm or less in terms of mass based on the entire polyethylene.

In the present embodiment, in addition to the components as described above, other known components useful for the production of a polyethylene fiber can also be contained.

The polyethylene fiber of the present embodiment may be composed of one polyethylene or two or more different polyethylenes. In the case of two or more polyethylenes, for example, polyethylenes having different viscosity average molecular weights may be combined. As the polyethylene constituting the polyethylene fiber of the present embodiment, ultrahigh molecular weight polyethylene is preferred, and the polyethylene fiber may be composed of ultrahigh molecular weight polyethylene alone as polyethylene, or ultrahigh molecular weight polyethylene and another resin may be combined. Another resin is not particularly limited, and examples thereof include other polyethylenes such as low density polyethylene and linear low density polyethylene, polypropylene, and polystyrene. One of these other resins may be combined alone, or two or more of these other resins may be combined.

[Method for Producing Polyethylene]

The polyethylene used for the polyethylene fiber of the present embodiment is preferably produced using a general Ziegler-Natta catalyst, which is not particularly limited.

Examples of the polymerization method in the method for producing polyethylene include a method of (co)polymerizing ethylene or a monomer comprising ethylene by a suspension polymerization method or a gas phase polymerization method. Of these, the suspension polymerization method that can efficiently remove polymerization heat is preferred. In the suspension polymerization method, an inert hydrocarbon medium can be used as a medium, and further an olefin itself can also be used as a solvent.

The above inert hydrocarbon medium is not particularly limited, and specific examples can include aliphatic hydrocarbons such as propane, butane, isobutane, pentane, isopentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethyl chloride, chlorobenzene, and dichloromethane; and mixtures thereof.

The polymerization temperature in the method for producing polyethylene is usually preferably 30° C. or more and 100° C. or less, more preferably 35° C. or more and 90° C. or less, and further preferably 40° C. or more and 80° C. or less. When the polymerization temperature is 30° C. or more, industrially efficient production is possible. On the other hand, when the polymerization temperature is 100° C. or less, stable operation is continuously possible.

The polymerization pressure in the method for producing polyethylene is usually preferably 0.1 MPa or more and 2 MPa or less, more preferably 0.1 MPa or more and 1.5 MPa or less, and further preferably 0.1 MPa or more and 1.0 MPa or less. When the polymerization pressure is equal to or more than normal pressure, an ethylene polymer having a low residual catalyst ash content tends to be obtained. When the polymerization pressure is 2 MPa or less, no lump scale is formed, and polyethylene tends to be able to be stably produced.

In the polyethylene fiber of the present embodiment, the composition fraction of the component (γ) having the highest mobility is 1% or more and 10% or less, and the relaxation time of the component (γ) having the highest mobility is 100 μs or more and 1000 μs or less, as described above. In other words, it is preferred that when the polyethylene fiber is divided into three components having different molecular mobility, the amounts of the respective components are suitably controlled. For that, it is preferred that while the molecular chains of polyethylene are highly drawn to form extended chain crystals, moderate entanglement is caused.

The method for suppressing the entanglement of polyethylene is not particularly limited, and examples thereof include using an organomagnesium for a promoter, contacting the promoter and a catalyst with each other followed by feeding to a polymerization vessel, and intermittently feeding the promoter and a catalyst from the same line. By using an organomagnesium as a promoter, the growth and crystallization of the polyethylene chains can be moderately controlled. Further, by contacting a catalyst and a promoter with each other followed by feeding to a polymerization vessel, the unevenness of entanglement among polyethylene particles can be suppressed.

The method for causing the entanglement of the molecules is not particularly limited, and examples thereof include controlling slurry concentration in a polymerization system, placing no baffle plate in a polymerization vessel, and using only a catalyst feed nozzle and a slurry removal nozzle for nozzles other than the nozzle of a stirring blade. The slurry concentration in the polymerization system is preferably 30% by mass or more and 50% by mass or less, more preferably 40% by mass or more and 50% by mass or less. By setting the slurry concentration at 30% by mass or more, the temperature of the vicinity of the reaction sites on the catalyst is maintained moderately high during polymerization to promote the entanglement of the molecules, and thus the constraint between the molecules tends to be able to be increased. On the other hand, by setting the slurry concentration at 50% by mass or less, no lump scale is formed, and an ethylene polymer tends to be able to be stably produced.

The solvent separation in the method for producing polyethylene can be performed, for example, by a decantation method, a centrifugation method, or a filter filtration method, which is not particularly limited. From the viewpoint of the efficiency of the separation of the ethylene polymer and the solvent, the centrifugation method is preferred. The amount of the solvent contained in the ethylene polymer after solvent separation is not particularly limited but is preferably 70% by mass or less, more preferably 60% by mass or less, and further preferably 50% by mass or less based on the mass of the ethylene polymer.

The deactivation of the catalyst used for synthesizing polyethylene is preferably carried out after polyethylene and the solvent are separated, which is not particularly limited. By introducing an agent for deactivating the catalyst, after separation from the solvent, the precipitation of the low molecular weight components, the catalyst component, and the like contained in the solvent can be reduced.

Examples of the agent for deactivating the catalyst system is not particularly limited and can include oxygen, water, alcohols, glycols, phenols, carbon monoxide, carbon dioxide, ethers, carbonyl compounds, and alkynes.

The drying temperature in the method for producing polyethylene is usually preferably 50° C. or more and 150° C. or less, more preferably 50° C. or more and 130° C. or less, and further preferably 50° C. or more and 100° C. or less. When the drying temperature is 50° C. or more, efficient drying is possible. On the other hand, when the drying temperature is 150° C. or less, drying can be performed in a state in which the decomposition and crosslinking of the ethylene polymer are suppressed.

(Method for Producing Polyethylene Fiber)

One example of a method for producing the polyethylene fiber of the present embodiment will be described below.

(Preparation of Slurry Solution of Polyethylene and Solvent)

Polyethylene particles and a solvent, and an additive such as an antioxidant as needed, are blended to prepare a slurry solution.

The solvent is not limited as long as it is a solvent suitable for spinning. Examples of the solvent include hydrocarbons having a boiling point of more than 100° C. at atmospheric pressure. The solvent is not particularly limited, and specific examples include halogenated hydrocarbons, mineral oils, liquid paraffins, decalin, tetralin, naphthalene, xylene, toluene, dodecane, undecane, decane, nonane, octene, cis-decahydronaphthalene, trans-decahydronaphthalene, low molecular weight polyethylene waxes, and mixtures thereof. Among these, mineral oils, liquid paraffins, and mixtures thereof are preferred.

It is preferred that as the blending ratio between the polyethylene particles and the solvent, the amount of the polyethylene particles is 20% by mass or more and 40% by mass or less, and the amount of the solvent is 60% by mass or more and 80% by mass or less. The slurry solution is preferably introduced into an extruder in a state of being heated to 110° C. or more and 125° C. or less.

After the slurry solution is introduced into the extruder, the solvent is preferably introduced from the middle of the extruder by liquid addition equipment so that for the blending ratio between the polyethylene particles and the solvent at the extruder outlet, the amount of the polyethylene particles is 5% by mass or more and 15% by mass or less, and the amount of the solvent is 85% by mass or more and 95% by mass or less. The solvent introduced by liquid addition is preferably introduced in a state of being heated to 200° C. or more.

The extruder into which the slurry solution is introduced may be any extruder, and examples thereof include twin-screw extruders such as corotating twin-screw extruders.

The formation of the mixture by extruding the slurry solution may be performed at a temperature higher than the temperature at which the polyethylene particles melt. The mixture of the polyethylene particles and the solvent formed by the extruder may therefore be a liquid mixture of the melt polyethylene particles and the solvent. The temperature at which the liquid mixture of the melt polyethylene particles and the solvent is formed in the extruder is preferably 140° C. or more and 320° C. or less, more preferably 200° C. or more and 300° C. or less, and further preferably 220° C. or more and 280° C. or less. The melt residence time in the extruder is preferably 5 min or more and 30 min or less, more preferably 10 min or more and 25 min or less, and further preferably 15 min or more and 20 min or less.

The thus obtained liquid mixture is spun through a spinneret. The temperature of the spinneret is preferably 140° C. or more and 320° C. or less, more preferably 200° C. or more and 300° C. or less, and further preferably 220° C. or more and 280° C. or less. The hole diameter of the spinneret is preferably 0.3 mm or more and 1.5 mm or less, and the discharge rate is preferably 1 m/min or more and 3 m/min or less.

The discharged yarn comprising the solvent is preferably wound while being slowly cooled. Specifically, for example, the yarn can be introduced into the same solvent as the one used for making the slurry solution, at 120° C. or more and 125° C. or less, through an air gap of 1 to 5 cm, and wound while being slowly cooled. The winding rate is preferably 3 m/min or more and 60 m/min or less, more preferably 3 m/min or more and 50 m/min or less, and further preferably 5 m/min or more and 40 m/min or less.

Then, the solvent is removed from the yarn. The method for removing the solvent differs depending on the type of the spinning solution. For example, in the case of a liquid paraffin, the yarn is immersed in a solvent such as hexane for extraction operation, and then dried under the condition of 30° C. or more and 50° C. or less for 1 h or more.

The obtained fiber is generally subjected to drawing processing. The crystal structure of the polyethylene fiber subjected to drawing processing is influenced by the drawing step conditions. The yarn is generally subjected to drawing processing at a yarn temperature of about 100° C., and as its previous step, the yarn is preferably heated in a constant temperature oven so that the yarn temperature reaches 30° C. or more and 50° C. or less, and predrawn 1.5 times to 3.0 times. Next, the predrawn yarn is heated in a constant temperature oven so that the yarn temperature reaches 100° C. or more and 140° C. or less, and primarily drawn 5.0 times to 50 times, and the drawn yarn is wound. Then, the drawn yarn is heated in a constant temperature oven so that the primarily drawn yarn reaches 140° C. or more and 160° C. or less, and further secondarily drawn, and a polyethylene fiber can be obtained.

The polyethylene fiber of the present embodiment can be used in various applications, and examples of the applications include ropes, nets, fishing lines, gloves, clothes, bulletproof vests, the bulletproof covers of armored cars, laminates, sporting goods, and sutures. Especially, the polyethylene fiber of the present embodiment is preferred for marine use, and particularly can be preferably utilized as ship mooring ropes, yacht ropes, fishing lines, and fishing nets.

EXAMPLES

The present invention will be described in more detail below using Examples and Comparative Examples, but the present invention is not limited in any way by following Examples.

[Methods for Measuring Various Properties and Physical Properties Used in Examples and Comparative Examples]

(1) Pulsed Nuclear Magnetic Resonance (NMR) Solid Echo Method

The free induction decay (M(t)) of a polyethylene fiber at 90° C. measured by the pulsed NMR solid echo method was measured under following conditions.

Measuring apparatus: JNM-Mu25 manufactured by JEOL Ltd.
Amount of sample: about 400 mg
Observed nucleus: $^1$H
Measurement: $T_2$
Measurement method: solid echo method
Pulse width: 2.2 to 2.3 μs
Pulse interval: 7.0 μs to 9.2 μs
Number of accumulations: 256
Measurement temperature: 30° C., 50° C., 70° C., 90° C. (the measurement temperature was the temperature inside the sample, the apparatus temperature was adjusted so that the temperature inside the sample reached the measurement temperature 5 min after the apparatus temperature reached the set temperature, and measurement was started)
Repetition time: 3 s
Analysis method: When fitting was performed by analysis software (IGOR Pro 6.3) using following formula 1, for approximation to three components of the component (α) having the lowest mobility, the component (β) having the intermediate mobility, and the component (γ) having the highest mobility, the composition fractions and relaxation time of the three components were obtained.

$$M(t) = \alpha \exp(-(1/2)(t/T_\alpha)^2) \sin bt/bt + \beta \exp(-(1/Wa)(t/T_\beta)^{Wa}) + \gamma \exp(-t/T_\gamma) \quad \text{formula 1}$$

α: the composition fraction (%) of the component (α)
$T_\alpha$: the relaxation time (msec) of the component (α)
β: the composition fraction (%) of the component (β)
$T_\beta$: the relaxation time (msec) of the component (β)
γ: the composition fraction (%) of the component (γ)
$T_\gamma$: the relaxation time (msec) of the component (γ)
t: observation time (msec)
Wa: shape factor (1<Wa<2)
b: shape factor (0.1<b<0.2)

(2) Measurement of Limiting Viscosity (η)

The limiting viscosity of each of the polyethylene fibers produced in the Examples and the Comparative Examples was obtained by the method shown below with reference to ISO 1628-3: 2010.

First, 4.5 mg of the polyethylene fiber was weighed into a dissolution tube, and the dissolution tube was purged with nitrogen. Then, 20 mL of decahydronaphthalene (decahydronaphthalene to which 1 g/L of 2,6-di-t-butyl-4-methylphenol was added) was added, and the polyethylene fiber was dissolved at 150° C. for 1.5 h with stirring using a stirring bar. For the solution, the falling time between marked lines ($t_s$) was measured in a constant temperature oven at 135° C. using a Cannon-Fenske type viscometer. Similarly, the falling time of only decalin, which did not contain the polyethylene fiber, as a blank ($t^b$) was measured.

The reduced viscosity (ηsp/C) of the polymer obtained according to following formula 2 was substituted into formula 3 to obtain the limiting viscosity (η).

$$(\eta sp/C)=(t_s/t_b-1)/((m/1000)/(20*1.107)*100) \text{(unit: dL/g)} \quad \text{formula 2}$$

m: sample mass (mg)
C: sample solution concentration (m/1000/(20*1.107)*100) (g/100 mL)

$$(\eta)=(\eta sp/C)/(1+0.27*C*(\eta sp/C)) \quad \text{formula 3}$$

C: sample solution concentration (g/100 mL)

(3) Presence or Absence of Endothermic Peak in Range of 152° C. or More in DSC Curve of Second Temperature Increase Process With Differential Scanning Calorimeter (DSC)

For each of the polyethylene fibers produced in the Examples and the Comparative Examples, measurement was performed using a DSC (trade name: DSC8000 manufactured by PerkinElmer Inc.). Specifically, an aluminum pan was charged with 8 to 10 mg of the polyethylene fiber and placed in the DSC, and then measurement was performed under the measurement conditions of following (i) to (iii).

(DSC Measurement Conditions)

(i) The temperature is maintained at 50° C. for 1 min and then increased to 180° C. at a temperature increase rate of 10° C./min.

(ii) The temperature is maintained at 180° C. for 5 min and then decreased to 50° C. at a temperature decrease rate of 10° C./min.

(iii) The temperature is maintained at 50° C. for 5 min and then increased to 180° C. at a temperature increase rate of 10° C./min.

Whether or not an endothermic peak was detected (observed) in the range of 152° C. or more in the DSC curve of the second temperature increase process (measurement condition (iii)) was measured.

(4) Ratio (B)/(A) Between Melting Heat Quantity (A) Detected in Range of 160° C. to 170° C. in DSC Curve of Temperature Increase Process With Differential Scanning Calorimeter (DSC) and Melting Heat Quantity (B) Detected in Range of 160° C. to 170° C. in DSC Curve of Temperature Increase Process After Temperature Maintenance at 140° C.

For each of the polyethylene fibers produced in the Examples and the Comparative Examples, measurement was performed using a DSC (trade name: DSC8000 manufactured by PerkinElmer Inc.). Specifically, an aluminum pan was charged with 8 to 10 mg of the polyethylene fiber and placed in the DSC, and then measurement under the measurement condition of following (I) and measurement under the measurement conditions of (II) to (IV) were performed.

(DSC Measurement Conditions)

(I) The temperature is maintained at 50° C. for 1 min and then increased to 180° C. at a temperature increase rate of 10° C./min.

(II) The temperature is maintained at 50° C. for 1 min and then increased to 140° C. at a temperature increase rate of 10° C./min.

(III) The temperature is maintained at 140° C. for 5 min and then decreased to 50° C. at a temperature decrease rate of 10° C./min.

(IV) The temperature is maintained at 50° C. for 5 min and then increased to 180° C. at a temperature increase rate of 10° C./min.

The melting heat quantity (A) detected in the range of 160° C. to 170° C. in the DSC curve of the temperature increase process of the measurement condition (I), and the melting heat quantity (B) detected in the range of 160° C. to 170° C. in the DSC curve of the second temperature increase process (measurement condition (IV)) of the measurement conditions (II) to (IV) were measured, and (B)/(A) was obtained.

(5) Strength

The strength of a polyethylene fiber was calculated by measuring the maximum load value (unit: cN) with following apparatus and measurement conditions and dividing the maximum load value by the fineness. The fineness is the mass per yarn×$10^4$ m, and the unit is expressed in dtex.

Apparatus: TENSILON manufactured by A&D Company, Limited
Distance between chucks: 500 mm
Tensile rate: 250 mm/min (6) Creep Resistance Under Salting and Drying Cycle Test The creep resistance of a polyethylene fiber under a salting and drying cycle test was calculated as follows. A load was applied to a polyethylene fiber at 30% of the breaking stress with following apparatus and test conditions, and the time until the polyethylene fiber (yarn) extended and broke was calculated as the creep resistance. The breaking stress was calculated by dividing the maximum load value in the tensile test of (5) by the cross-sectional area of the polyethylene fiber. The evaluation criteria are as follows.

Apparatus: salting-drying-wetting combined cycle tester ISO-3-CY.R manufactured by Suga Test Instruments Co., Ltd.

Salting and drying cycle test conditions: the spraying of 5% salt water at 70° C. for 12 h followed by 70° C. and a relative humidity of 50% for 12 h.

(Evaluation Criteria)

◉: the polyethylene fiber did not break for 3 cycles

○: the polyethylene fiber did not break for 2 cycles but broke before the completion of 3 cycles x: the polyethylene fiber broke before the completion of 2 cycles (7) Strength Retention Rate Under Salting and Drying Cycle Test The strength retention rate of a polyethylene fiber under a salting and drying cycle test was calculated as follows. For a polyethylene fiber after being subjected to a salting and drying cycle test with following apparatus and test conditions, the tensile strength was measured by the method described in the above (5), and the strength retention rate was obtained by following formula. The evaluation criteria are as follows.

Apparatus: salting-drying-wetting combined cycle tester ISO-3-CY.R manufactured by Suga Test Instruments Co., Ltd.

Salting and drying cycle test conditions: A cycle of the spraying of 5% salt water at 70° C. for 12 h followed by 70° C. and a relative humidity of 50% for 12 h was carried out three times.

strength retention rate (%)=(strength after salting and drying cycle test/strength before salting and drying cycle test)×100

(Evaluation Criteria)
◎: the strength retention rate was 90% or more
○: the strength retention rate was 80% or more and less than 90%
x: the strength retention rate was less than 80%
(8) Breaking Endurance (Wear Resistance) Under Salting and Drying Cycle Test (Under Corrosive Environment)

The breaking endurance of a polyethylene fiber under a salting and drying cycle test (under a corrosive environment) was calculated as follows. With following apparatus and test conditions, polyethylene fibers were hung on a 10 mm diameter iron pipe, and a load was applied at both ends so that a force of 10% of the breaking stress was applied to the polyethylene fibers, and the number of polyethylene fibers that did not break and remained was evaluated as the breaking endurance (wear resistance). The evaluation criteria are as follows.

Number of test fibers: 10
Apparatus: salting-drying-wetting combined cycle tester ISO-3-CY.R manufactured by Suga Test Instruments Co., Ltd.

Salting and drying cycle test conditions: The spraying of 5% salt water at 70° C. for 12 h followed by 70° C. and a relative humidity of 50% for 12 h was carried out three times.

(Evaluation Criteria)
◎: Nine or more polyethylene fibers did not break
○: Five or more and less than nine polyethylene fibers did not break
x: Six or more polyethylene fibers broke
(9) Chlorine Content in Polyethylene Fiber A polyethylene fiber was burned by an automatic sample burning apparatus (AQF-100 manufactured by Mitsubishi Chemical Analytech Co., Ltd.) and then absorbed by an absorbing liquid (a mixed solution of $Na_2CO_3$ and $NaHCO_3$), and the absorbing liquid was injected into an ion chromatograph apparatus (ICS1500 manufactured by Dionex, column (separation column: AS12A, guard column: AG12A), suppressor ASRS300) to measure the total amount of chlorine.

(10) Aluminum Content in Polyethylene Fiber 0.2 g of a polyethylene fiber was weighed into a decomposition container made of Teflon (registered trademark), and high purity nitric acid was added followed by pressure decomposition by a microwave decomposition apparatus ETHOS-TC manufactured by Milestone General K.K. Then, the total amount was adjusted at 50 mL with pure water purified by an ultrapure water production apparatus manufactured by Nihon Millipore K.K., for use as a test liquid. For the above test liquid, aluminum was quantified by an internal standard method using an inductively coupled plasma mass spectrometer (ICP-MS) X SERIES 2 manufactured by Thermo Fisher Scientific K.K.

Reference Example 1

Catalyst Synthesis Example

[Preparation of Solid Catalyst Component [A]]
1,600 mL of hexane was added to an 8 L stainless steel autoclave sufficiently purged with nitrogen. 800 mL of a 1 mol/L titanium tetrachloride hexane solution and 800 mL of a 1 mol/L hexane solution of the organomagnesium compound represented by the composition formula $AlMg_5(C_4H_9)_{11}(OSi(C_2H_5)H)_2$ were simultaneously added over 3 h with stirring at 0° C. After the addition, the temperature was slowly increased, and the reaction was continued at 5° C. for 1 h. After the completion of the reaction, 1,600 mL of the supernatant liquid was removed followed by washing five times with 1,600 mL of hexane to prepare a solid catalyst component [A].

Reference Example 6

Catalyst Synthesis Example

[Preparation of Solid Catalyst Component [F]]
(1) Synthesis of Starting Material Silica Component [f-1]
Spherical silica having an average particle diameter of 7 μm, a surface area of 700 m²/g, and an intraparticle pore volume of 1.9 mL/g was calcined under a nitrogen atmosphere at 500° C. for 5 h for dehydration.

40 g of this dehydrated silica was dispersed in 800 mL of hexane in an autoclave having a capacity of 1.8 L under a nitrogen atmosphere to obtain a slurry.

While the obtained slurry was kept at 20° C. under stirring, 100 mL of a hexane solution of triethylaluminum (concentration 1 mol/L) was dropped in 1 h. Then, the mixture was stirred at the same temperature for 2 h. Then, in the obtained reaction mixture, the unreacted triethylaluminum in the supernatant liquid was removed by decantation. In this manner, 800 mL of a hexane slurry of a silica component [f-1] treated with triethylaluminum was obtained.

(2) Preparation of Starting Material Titanium Complex Component [f-2]

200 mmol of [(N-t-butylamido) (tetramethyl-η5-cyclopentadienyl)dimethylsilane]titanium-1,3-pentadiene (hereinafter described as a "titanium complex") was dissolved in 1250 mL of Isopar E [the trade name of a hydrocarbon mixture manufactured by ExxonMobil Chemical (USA)], 25 mL of a 1 mol/L hexane solution of $Mg_6(C_2H_5)_6(n-C_4H_9)_6Al(C_2H_5)_3$ previously synthesized from triethylaluminum and butylethylmagnesium was added, and further hexane was added to adjust the titanium complex concentration at 0.1 mol/L to obtain a titanium complex component [f-2].

(3) Preparation of Starting Material Reaction Mixture [f-3]
5.7 g of bis(hydrogenated tallow alkyl)methylammonium-tris(pentafluorophenyl) (4-hydroxyphenyl) borate (hereinafter described as a "borate") was added to 50 mL of toluene and dissolved to obtain a 100 mmol/L toluene solution of the borate. 5 mL of a 1 mol/L hexane solution of ethoxydiethylaluminum was added to this toluene solution of the borate at room temperature, and further hexane was added so that the borate concentration in the solution was 70 mmol/L. Then, the solution was stirred at room temperature for 1 h to obtain a reaction mixture [f-3] comprising the borate.

(4) Synthesis of Solid Catalyst Component [F]
While 800 mL of the slurry of the silica component [f-1] obtained in the above (1) was stirred at 20° C., 32 mL of the titanium complex component [f-2] obtained in the above (2), and 46 mL of this reaction mixture [f-3] comprising the borate obtained in the above (3) were simultaneously added in 1 h. Further, the mixture was stirred at the same temperature for 1 h to react the titanium complex and the borate. After the completion of the reaction, the supernatant liquid was removed, and the unreacted catalyst starting materials were removed with hexane to obtain a solid catalyst component [F] in which a catalytically active species was formed on the silica.

(Preparation of Hydrogenated Catalyst [G])
37.3 g of titanocene dichloride was introduced with 1 L of hexane into a SUS autoclave equipped with a stirrer and having a capacity of 2.0 L that was purged with nitrogen. 429 mL of 0.7 mol/L of a mixture of triisobutylaluminum and diisobutylaluminum hydride (triisobutylaluminum: diisobutylaluminum hydride=9:1 (molar ratio)) was added by a pump at room temperature over 1 h with stirring at 500 rpm. After the addition, the line was washed with 71 mL of hexane. Stirring was continued for 1 h to obtain a 100 mM/L dark blue homogeneous solution (hydrogenated catalyst [G]).

Reference Example 2

Polyethylene Polymerization Example

[Polymerization of Polyethylene Particles [B]]

Hexane, ethylene, a catalyst, and a promoter were continuously supplied to a vessel type 300 L polymerization reactor equipped with a stirring apparatus. The polymerization pressure was 0.4 MPa. The polymerization temperature was kept at 82° C. by jacket cooling. The solid catalyst component [A] and $AlMg_6(C_4H_9)_{12}$ as the promoter were used. $AlMg_6(C_4H_9)_{12}$ was supplied at a rate of 10 mmol/h, contacted with the solid catalyst component [A], and then added to the polymerization vessel. The solid catalyst component [A] was supplied so that the ethylene polymer production rate was 10 kg/h, and the slurry concentration in the polymerization reactor was 40% by mass. Ethylene was supplied so that the pressure was kept. Hexane was supplied so that the liquid level was kept constant. The polymerization slurry was continuously removed to a flash drum at a pressure of 0.05 MPa and a temperature of 70° C. to separate the unreacted ethylene. The separated ethylene polymer powder was dried with nitrogen blowing at 90° C. In this drying step, steam was sprayed on the powder after polymerization to carry out the deactivation of the catalyst and the promoter. A sieve having an opening of 425 μm was used for the obtained ethylene polymer powder to remove particles not passing through the sieve to obtain polyethylene particles [B]. The limiting viscosity of the polyethylene particles [B] was 15.

Reference Example 3

Polyethylene Polymerization Example

[Polymerization of Polyethylene Particles [C]]

Polyethylene particles [C] were obtained as in Reference Example 2 except that the polymerization temperature was 78° C. The limiting viscosity of the polyethylene particles [C] was 20.

Reference Example 4

Polyethylene Polymerization Example

[Polymerization of Polyethylene Particles [D]]

Polyethylene particles [D] were obtained as in Reference Example 2 except that the polymerization temperature was 55° C. The limiting viscosity of the polyethylene particles [D] was 30.

Reference Example 5

Polyethylene Polymerization Example

[Polymerization of Polyethylene Particles [E]]

Polyethylene particles [E] were obtained as in Reference Example 2 except that the polymerization temperature was 55° C., and triisobutylaluminum was used as the promoter and fed to the polymerization reactor from another line without being contacted with the catalyst. The limiting viscosity of the polyethylene particles [E] was 27.

Reference Example 7

Polyethylene Polymerization Example

[Polymerization of Polyethylene Particles [H]]

A vessel type 300 L polymerization reactor equipped with a stirring apparatus was used. The polymerization temperature was kept at 75° C. by jacket cooling. Normal hexane as a solvent was supplied at 60 L/h. The solid catalyst component [F] was supplied so that the polymerization rate was 10 kg/h. A 1 mol/L hexane solution of the organomagnesium compound represented by the composition formula $AlMg_5(C_4H_9)_{11}(OSi(C_2H_5)H)_2$ was supplied at 6 mmol/h as the total amount of Mg and Al after being contacted with the solid catalyst component [F]. Hydrogen was supplied to feed piping for the solid catalyst component [F] at 2 NL/h. The hydrogenated catalyst [G] was separately supplied to this feed piping so that the concentration in the reactor was 3.6 μmol/L. Ethylene was supplied to the gas phase portion under the conditions of a polymerization pressure of 0.8 MPaG and an average residence time of 3 h for continuous polymerization. As in Reference Example 2 except for the foregoing, polyethylene particles [H] were obtained. The limiting viscosity of the polyethylene particles [H] was 30.

Reference Example 8

Polyethylene Polymerization Example

[Polymerization of Polyethylene Particles [I]]

Polyethylene particles [I] were obtained as in Reference Example 2 except that the polymerization temperature was 50° C., and triisobutylaluminum was used as the promoter and fed to the polymerization reactor from another line without being contacted with the catalyst. The limiting viscosity of the polyethylene particles [I] was 29.

Example 1

(Method for Producing Polyethylene Fiber)

Using the polyethylene particles [B] and a liquid paraffin (P-350 (trademark) manufactured by MATSUMURA OIL Co., Ltd.), a slurry solution was prepared so that the amount of the polyethylene particles was 30% by mass. Further, 1 part by mass of pentaerythrityl-tetrakis[3-(3,5-di-t-butyl-4-hydroxyphenyl) propionate] as an antioxidant was added to 100 parts by mass of the slurry solution. Next, the prepared slurry solution was heated to 110° C. and then introduced into a twin-screw extruder. Further, the liquid paraffin at 200° C. was introduced from the middle stage of the extruder by liquid addition equipment so that the concentration of polyethylene at the extruder outlet was 10% by mass. The liquid mixture obtained by extrusion was spun through a spinneret having a hole diameter of 1.0 mm. The discharge rate was 1.0 m/min. Next, the spun fiber was contacted with the liquid paraffin at 120° C. through an air gap of 3 cm for 1 min, then cooled to room temperature, and wound. The winding rate was 5 m/min.

Next, the liquid paraffin was extracted from the obtained fiber with hexane followed by drying at 40° C. for 1 h.

The dried fiber was heated in a constant temperature oven so that the yarn temperature reached 50° C., and predrawn 2.0 times. Next, the fiber was heated in a constant temperature oven so that the yarn temperature reached 120° C., and primarily drawn 15 times to obtain a drawn yarn. Then, the drawn yarn was heated in a constant temperature oven so that the yarn temperature reached 140° C., secondarily drawn 5 times, and cooled to 25° C. at a rate of 10° C./min to obtain a polyethylene fiber.

The physical properties of the obtained polyethylene fiber were measured by the above-described methods. The measurement results are shown in following Table 1.

Example 2

A polyethylene fiber was obtained as in Example 1 except that the polyethylene particles [C] were used as the starting material, and the liquid paraffin was introduced by liquid addition equipment so that the concentration of polyethylene at the extruder outlet was 9% by mass.

Example 3

A polyethylene fiber was obtained as in Example 1 except that the polyethylene particles [D] were used as the starting material, and the liquid paraffin was introduced by liquid addition equipment so that the concentration of polyethylene at the extruder outlet was 8% by mass.

Example 4

A polyethylene fiber was obtained as in Example 3 except that the concentration of the slurry solution was adjusted at 8% by mass, and the liquid paraffin was not introduced from the middle stage of the extruder.

Example 5

A polyethylene fiber was obtained as in Example 3 except that after spinning, the spun fiber was rapidly cooled to room temperature without being contacted with the liquid paraffin at 120° C.

Example 6

A polyethylene fiber was obtained as in Example 3 except that the draw ratio was 3 times in predrawing, and the draw ratio was 10 times in primary drawing.

Example 7

A polyethylene fiber was obtained as in Example 3 except that the draw ratio was 1.5 times in predrawing, and the draw ratio was 20 times in primary drawing.

Example 8

A polyethylene fiber was obtained as in Example 3 except that the polyethylene particles [H] were used as the starting material.

Example 9

A polyethylene fiber was obtained as in Example 7 except that the yarn was drawn at 140° C. and then cooled to 25° C. at 50° C./min.

Example 10

A polyethylene fiber was obtained as in Example 7 except that predrawing was not performed, and the draw ratio was 30 times in primary drawing.

Example 11

A polyethylene fiber was obtained as in Example 3 except that the polyethylene particles [I] were used as the starting material.

Comparative Example 1

A polyethylene fiber was obtained as in Example 3 except that predrawing was not performed, the draw ratio was 30 times in primary drawing, and the yarn was drawn at 140° C. and then cooled to 25° C. at 50° C./min.

Comparative Example 2

A polyethylene fiber was obtained as in Example 3 except that the temperature of the constant temperature oven was 25° C. in predrawing, and the yarn was drawn at 140° C. and then cooled to 25° C. at 50° C./min.

Comparative Example 3

A polyethylene fiber was obtained as in Example 3 except that the draw ratio was 1.2 times in predrawing, the draw ratio was 25 times in primary drawing, and the yarn was drawn at 140° C. and then cooled to 25° C. at 50° C./min.

Comparative Example 4

A polyethylene fiber was obtained as in Example 3 except that the polyethylene particles [E] were used as the starting material, and the yarn was drawn at 140° C. and then cooled to 25° C. at 50° C./min.

Comparative Example 5

A polyethylene fiber was obtained as in Comparative Example 1 except that the polyethylene particles [E] were used as the starting material, and the yarn was drawn at 140° C. and then cooled to 25° C. at 10° C./min.

TABLE 1

| | Example 1 | Example 2 | Example 3 | Example 4 | Example 5 | Example 6 | Example 7 | Example 8 | Example 9 |
|---|---|---|---|---|---|---|---|---|---|
| Proportion (%) of component (γ) | 9.0 | 6.0 | 4.0 | 3.0 | 2.1 | 1.5 | 3.5 | 3.0 | 5.0 |
| Relaxation time (μs) of component (γ) | 900 | 550 | 480 | 400 | 280 | 200 | 800 | 300 | 750 |
| Limiting viscosity (η) | 12 | 16 | 26 | 28 | 26 | 26 | 26 | 28 | 26 |
| Presence or absence of peak at 152° C. or more in DSC second temperature increase | Absent | Absent | Absent | Present | Absent | Absent | Absent | Absent | Absent |

TABLE 1-continued

| | | | | | | | | | |
|---|---|---|---|---|---|---|---|---|---|
| Melting Heat Quantity Ratio B/A at 160° C. to 170° C. | 1.2 | 1.5 | 2.2 | 2.3 | 3.5 | 2.4 | 2.2 | 2.5 | 2.7 |
| Fiber (yarn) strength (cN/dtex) | 28 | 32 | 35 | 36 | 34 | 34 | 36 | 37 | 34 |
| Creep resistance under salting and drying cycle test | ○ | ○ | ◎ | ◎ | ◎ | ○ | ○ | ◎ | ○ |
| Strength retention rate under salting and drying cycle test | ○ | ○ | ◎ | ○ | ◎ | ○ | ○ | ◎ | ○ |
| Breaking endurance under salting and drying cycle test | ○ | ○ | ◎ | ◎ | ○ | ○ | ○ | ◎ | ○ |
| Chlorine content (ppm) | 15 | 25 | 40 | 40 | 40 | 40 | 40 | 1 | 40 |
| Aluminum content (ppm) | 1 | 1.5 | 2 | 2 | 2 | 2 | 2 | 5 | 2 |

| | Example 10 | Example 11 | Comparative Example 1 | Comparative Example 2 | Comparative Example 3 | Comparative Example 4 | Comparative Example 5 |
|---|---|---|---|---|---|---|---|
| Proportion (%) of component (γ) | 5.2 | 5.5 | 12.0 | 11.0 | 5.0 | 11.0 | 13.0 |
| Relaxation time (μs) of component (γ) | 600 | 500 | 1200 | 640 | 1500 | 85 | 90 |
| Limiting viscosity (η) | 26 | 26 | 26 | 26 | 26 | 23 | 23 |
| Presence or absence of peak at 152° C. or more in DSC second temperature increase | Absent | Absent | Absent | Absent | Absent | Absent | Absent |
| Melting Heat Quantity Ratio B/A at 160° C. to 170° C. | 2 | 2.1 | 2.8 | 2.7 | 2.9 | 1.5 | 1.4 |
| Fiber (yarn) strength (cN/dtex) | 33 | 34 | 32 | 33 | 35 | 32 | 31 |
| Creep resistance under salting and drying cycle test | ○ | ○ | X | X | X | X | X |
| Strength retention rate under salting and drying cycle test | ○ | ○ | X | X | X | X | X |
| Breaking endurance under salting and drying cycle test | ○ | ○ | X | X | X | X | X |
| Chlorine content (ppm) | 40 | 50 | 40 | 40 | 40 | 60 | 60 |
| Aluminum content (ppm) | 2 | 5 | 2 | 2 | 2 | 6 | 6 |

INDUSTRIAL APPLICABILITY

The polyethylene fiber of the present embodiment can be used in various applications and can be used, for example, in rope, net, fishing line, glove, cloth, and laminate applications, which are not particularly limited. Particularly, the polyethylene fiber of the present embodiment can be preferably utilized as mooring ropes, yacht ropes, fishing lines, and fishing nets.

What is claimed is:

1. A polyethylene fiber wherein when a free induction decay (M(t)) of the polyethylene fiber at 90° C. measured by a pulsed nuclear magnetic resonance (NMR) solid echo method is approximated to three components of a component (α) having a lowest mobility, a component (β) having an intermediate mobility, and a component (γ) having a highest mobility, by fitting using following formula 1, a composition fraction of the component (γ) having the highest mobility is 1% or more and 10% or less, and a relaxation time of the component (γ) having the highest mobility is 100 μs or more and 1000 μs or less $$M(t) = \alpha \exp(-(1/2)(t/T_\alpha)^2)\sin bt/bt + \beta \exp(-(1/Wa)(t/T_\beta)^{Wa}) + \gamma \exp(-t/T_\gamma) \quad \text{formula 1}$$

α: a composition fraction (%) of the component (α)
$T_\alpha$: a relaxation time (msec) of the component (α)
β: a composition fraction (%) of the component (β)
$T_\beta$: a relaxation time (msec) of the component (β)
γ: a composition fraction (%) of the component (γ)
$T_\gamma$: a relaxation time (msec) of the component (γ)
t: observation time (msec)
Wa: shape factor (1<Wa<2)
b: shape factor (0.1<b<0.2).

2. The polyethylene fiber according to claim 1, wherein the composition fraction of the component (γ) having the highest mobility is 2% or more and 5% or less, and the relaxation time of the component (γ) having the highest mobility is 200 μs or more and 500 μs or less.

3. The polyethylene fiber according to claim 1, wherein a ratio (B)/(A) of a melting heat quantity (B) to a melting heat quantity (A) is 1 or more and 3 or less, wherein the melting heat quantity (A) is detected in a range of 160° C. to 170° C. in a DSC curve of a temperature increase process obtained by a measurement condition of following (I) using a differential scanning calorimeter (DSC), and the melting heat quantity (B) is detected in a range of 160° C. to 170° C. in a DSC curve of a second temperature increase process (measurement condition (IV)) obtained by measurement conditions of following (II) to (IV) using the DSC, (DSC Measurement Conditions)
(I) temperature is maintained at 50° C. for 1 min and then increased to 180° C. at a temperature increase rate of 10° C./min
(II) temperature is maintained at 50° C. for 1 min and then increased to 140° C. at a temperature increase rate of 10° C./min
(III) temperature is maintained at 140° C. for 5 min and then decreased to 50° C. at a temperature decrease rate of 10° C./min
(IV) temperature is maintained at 50° C. for 5 min and then increased to 180° C. at a temperature increase rate of 10° C./min.

4. The polyethylene fiber according to claim 1, wherein a ratio (B)/(A) of a melting heat quantity (B) to a melting heat quantity (A) is 1.5 or more and 2.7 or less, wherein the melting heat quantity (A) is detected in a range of 160° C. to 170° C. in a DSC curve of a temperature increase process obtained by a measurement condition of following (I) using a differential scanning calorimeter (DSC), and the melting heat quantity (B) is detected in a range of 160° C. to 170° C. in a DSC curve of a second temperature increase process (measurement condition (IV)) obtained by measurement conditions of following (II) to (IV) using the DSC, (DSC Measurement Conditions)
(I) temperature is maintained at 50° C. for 1 min and then increased to 180° C. at a temperature increase rate of 10° C./min
(II) temperature is maintained at 50° C. for 1 min and then increased to 140° C. at a temperature increase rate of 10° C./min
(III) temperature is maintained at 140° C. for 5 min and then decreased to 50° C. at a temperature decrease rate of 10° C./min
(IV) temperature is maintained at 50° C. for 5 min and then increased to 180° C. at a temperature increase rate of 10° C./min.

5. The polyethylene fiber according to claim 1, wherein no endothermic peak is detected in a range of 152° C. or more in a DSC curve of a second temperature increase process (measurement condition (iii)) obtained by measurement conditions of following (i) to (iii) using a differential scanning calorimeter (DSC), (DSC measurement conditions)
(i) temperature is maintained at 50° C. for 1 min and then increased to 180° C. at a temperature increase rate of 10° C./min
(ii) temperature is maintained at 180° C. for 5 min and then decreased to 50° C. at a temperature decrease rate of 10° C./min
(iii) temperature is maintained at 50° C. for 5 min and then increased to 180° C. at a temperature increase rate of 10° C./min.

6. The polyethylene fiber according to claim 5, wherein a ratio (B)/(A) of a melting heat quantity (B) to a melting heat quantity (A) is 1 or more and 3 or less, wherein the melting heat quantity (A) is detected in a range of 160° C. to 170° C. in a DSC curve of a temperature increase process obtained by a measurement condition of following (I) using a differential scanning calorimeter (DSC), and the melting heat quantity (B) is detected in a range of 160° C. to 170° C. in a DSC curve of a second temperature increase process (measurement condition (IV)) obtained by measurement conditions of following (II) to (IV) using the DSC, (DSC Measurement Conditions)
(I) temperature is maintained at 50° C. for 1 min and then increased to 180° C. at a temperature increase rate of 10° C./min
(II) temperature is maintained at 50° C. for 1 min and then increased to 140° C. at a temperature increase rate of 10° C./min
(III) temperature is maintained at 140° C. for 5 min and then decreased to 50° C. at a temperature decrease rate of 10° C./min
(IV) temperature is maintained at 50° C. for 5 min and then increased to 180° C. at a temperature increase rate of 10° C./min.

7. The polyethylene fiber according to claim 1, having a limiting viscosity (η) of 11 or more and 30 or less.

8. The polyethylene fiber according to claim 7, wherein a ratio (B)/(A) of a melting heat quantity (B) to a melting heat quantity (A) is 1 or more and 3 or less, wherein the melting heat quantity (A) is detected in a range of 160° C. to 170° C. in a DSC curve of a temperature increase process obtained by a measurement condition of following (I) using a differential scanning calorimeter (DSC), and the melting heat quantity (B) is detected in a range of 160° C. to 170° C. in a DSC curve of a second temperature increase process (measurement condition (IV)) obtained by measurement conditions of following (II) to (IV) using the DSC, (DSC Measurement Conditions)
(I) temperature is maintained at 50° C. for 1 min and then increased to 180° C. at a temperature increase rate of 10° C./min
(II) temperature is maintained at 50° C. for 1 min and then increased to 140° C. at a temperature increase rate of 10° C./min
(III) temperature is maintained at 140° C. for 5 min and then decreased to 50° C. at a temperature decrease rate of 10° C./min
(IV) temperature is maintained at 50° C. for 5 min and then increased to 180° C. at a temperature increase rate of 10° C./min.

9. The polyethylene fiber according to claim 7, wherein no endothermic peak is detected in a range of 152° C. or more in a DSC curve of a second temperature increase process (measurement condition (iii)) obtained by measurement conditions of following (i) to (iii) using a differential scanning calorimeter (DSC), (DSC Measurement Conditions)
(i) temperature is maintained at 50° C. for 1 min and then increased to 180° C. at a temperature increase rate of 10° C./min
(ii) temperature is maintained at 180° C. for 5 min and then decreased to 50° C. at a temperature decrease rate of 10° C./min
(iii) temperature is maintained at 50° C. for 5 min and then increased to 180° C. at a temperature increase rate of 10° C./min.

10. The polyethylene fiber according to claim 9, wherein a ratio (B)/(A) of a melting heat quantity (B) to a melting heat quantity (A) is 1 or more and 3 or less, wherein the melting heat quantity (A) is detected in a range of 160° C. to 170° C. in a DSC curve of a temperature increase process obtained by a measurement condition of following (I) using a differential scanning calorimeter (DSC), and the melting heat quantity (B) is detected in a range of 160° C. to 170° C. in a DSC curve of a second temperature increase process (measurement condition (IV)) obtained by measurement conditions of following (II) to (IV) using the DSC, (DSC Measurement Conditions)
(I) temperature is maintained at 50° C. for 1 min and then increased to 180° C. at a temperature increase rate of 10° C./min
(II) temperature is maintained at 50° C. for 1 min and then increased to 140° C. at a temperature increase rate of 10° C./min
(III) temperature is maintained at 140° C. for 5 min and then decreased to 50° C. at a temperature decrease rate of 10° C./min
(IV) temperature is maintained at 50° C. for 5 min and then increased to 180° C. at a temperature increase rate of 10° C./min.

11. The polyethylene fiber according to claim 1, having a limiting viscosity (η) of 15 or more and 30 or less.

12. The polyethylene fiber according to claim 1, having a chlorine (Cl) content of 50 ppm or less.

13. The polyethylene fiber according to claim 1, having an aluminum (Al) content of 5 ppm or less.

14. The polyethylene fiber according to claim 1, having a chlorine (Cl) content of 5 ppm or less.

15. A method of improving creep resistance in a marine product comprising incorporating into the marine product a polyethylene fiber wherein when a free induction decay (M(t)) of the polyethylene fiber at 90° C. measured by a pulsed nuclear magnetic resonance (NMR) solid echo method is approximated to three components of a component (α) having a lowest mobility, a component (β) having an intermediate mobility, and a component (γ) having a highest mobility, by fitting using following formula 1, a composition fraction of the component (γ) having the highest mobility is 1% or more and 10% or less, and a relaxation time of the component (γ) having the highest mobility is 100 μs or more and 1000 μs or less $$M(t) = \alpha \exp(-(1/2)(t/T_\alpha)^2)\sin bt/bt + \beta \exp(-(1/Wa)(t/T_\beta)^{Wa}) + \gamma \exp(-t/T_\gamma) \quad \text{formula 1}$$

α: a composition fraction (%) of the component (α)
$T_\alpha$: a relaxation time (msec) of the component (α)
β: a composition fraction (%) of the component (β)
$T_\beta$: a relaxation time (msec) of the component (β)
γ: a composition fraction (%) of the component (γ)
$T_\gamma$: a relaxation time (msec) of the component (γ)
t: observation time (msec)
Wa: shape factor (1<Wa<2)
b: shape factor (0.1<b<0.2).

16. The method of claim 15 wherein the marine product is selected from the group consisting of a mooring rope, yacht rope, fishing line and fishing net.

17. A mooring rope, yacht rope, fishing line or fishing net comprising a polyethylene fiber wherein when a free induction decay (M(t)) of the polyethylene fiber at 90° C. measured by a pulsed nuclear magnetic resonance (NMR) solid echo method is approximated to three components of a component (α) having a lowest mobility, a component (β) having an intermediate mobility, and a component (γ) having a highest mobility, by fitting using following formula 1, a composition fraction of the component (γ) having the highest mobility is 1% or more and 10% or less, and a relaxation time of the component (γ) having the highest mobility is 100 μs or more and 1000 μs or less $$M(t) = \alpha \exp(-(1/2)(t/T_\alpha)^2)\sin bt/bt + \beta \exp(-(1/Wa)(t/T_\beta)^{Wa}) + \gamma \exp(-t/T_\gamma) \quad \text{formula 1}$$

α: a composition fraction (%) of the component (α)
$T_\alpha$: a relaxation time (msec) of the component (α)
β: a composition fraction (%) of the component (β)
$T_\beta$: a relaxation time (msec) of the component (β)
γ: a composition fraction (%) of the component (γ)
$T_\gamma$: a relaxation time (msec) of the component (γ)
t: observation time (msec)
Wa: shape factor (1<Wa<2)
b: shape factor (0.1<b<0.2).

* * * * *